(12) United States Patent
Chen

(10) Patent No.: US 11,986,098 B1
(45) Date of Patent: May 21, 2024

(54) FOLDABLE CHAIR

(71) Applicant: Chusong Chen, Guangdong Province (CN)

(72) Inventor: Chusong Chen, Guangdong Province (CN)

(*) Notice: Subject to any disclaimer, the term of this patent is extended or adjusted under 35 U.S.C. 154(b) by 0 days.

(21) Appl. No.: 18/422,252

(22) Filed: Jan. 25, 2024

(30) Foreign Application Priority Data

Jan. 9, 2024 (CN) .......................... 202420054484.7

(51) Int. Cl.
A47C 4/26 (2006.01)
A47C 1/026 (2006.01)
A47C 1/032 (2006.01)
A47C 4/14 (2006.01)
A47C 4/16 (2006.01)
A47C 4/18 (2006.01)
A47C 4/24 (2006.01)
A47C 4/28 (2006.01)
A47C 4/38 (2006.01)
A47C 4/40 (2006.01)
A47C 4/48 (2006.01)
A47C 4/50 (2006.01)
A47C 15/00 (2006.01)
A63F 13/245 (2014.01)
A63F 13/803 (2014.01)
A47C 7/72 (2006.01)

(52) U.S. Cl.
CPC ................ A47C 4/26 (2013.01); A47C 1/026 (2013.01); A47C 1/03238 (2013.01); A47C 4/14 (2013.01); A47C 4/16 (2013.01); A47C 4/18 (2013.01); A47C 4/24 (2013.01); A47C 4/28 (2013.01); A47C 4/38 (2013.01); A47C 4/40 (2013.01); A47C 4/48 (2013.01); A47C 4/50 (2013.01); A47C 15/004 (2013.01); A63F 13/245 (2014.09); A63F 13/803 (2014.09); A47C 7/72 (2013.01)

(58) Field of Classification Search
CPC .... A47C 4/14; A47C 4/16; A47C 4/18; A47C 4/24; A47C 4/26; A47C 4/28; A47C 4/38; A47C 4/40; A47C 4/48; A47C 4/50; A47C 1/024; A47C 1/026; A47C 1/03238; A47C 7/72; A47C 15/004; A63F 13/245; A63F 13/803
USPC ....................................... 297/22, 23, 56, 357
See application file for complete search history.

(56) References Cited

U.S. PATENT DOCUMENTS 534,501 A * 2/1895 Evers ........................ A47C 4/40
297/23
1,779,935 A * 10/1930 Harter .................... A47C 1/026
297/363

(Continued)

FOREIGN PATENT DOCUMENTS

GB 2209665 A * 5/1989 ............... A47C 4/50

Primary Examiner — Robert Canfield

(57) ABSTRACT

A foldable chair, including a first bracket and a second bracket that are hingedly fixed in an X-shape, and an adjusting mechanism connecting an upper portion of the first bracket and a lower portion of the second bracket. The adjusting mechanism includes a fixing member and a movable member, the fixing member including a slide groove, and the movable member including a limit member movable within the slide groove; the slide groove has a serrated first inner side wall and a smooth second inner side wall, and the limit member is snapable to the first inner side wall.

8 Claims, 3 Drawing Sheets

(56) References Cited

U.S. PATENT DOCUMENTS

| | | | | |
|---|---|---|---|---|
| 2,381,149 | A * | 8/1945 | Wenneborg | A47C 4/40 297/23 |
| 2,776,704 | A * | 1/1957 | Moore | A47C 1/143 297/27 |
| 2,812,013 | A * | 11/1957 | Kreciglowa | A47C 7/44 297/359 |
| 4,252,367 | A * | 2/1981 | Vanderminden | A47C 4/30 297/23 |
| 5,094,509 | A * | 3/1992 | Bolzacchini | A47C 19/045 297/23 |
| 5,123,697 | A * | 6/1992 | Szczurek | A47C 13/00 297/23 |
| 5,244,249 | A * | 9/1993 | Tseng | A47C 4/50 297/391 |
| 5,464,268 | A * | 11/1995 | Levrangi | A47C 3/36 248/164 |
| 5,613,737 | A * | 3/1997 | Tseng | A47C 1/0265 297/411.42 |
| 5,931,526 | A * | 8/1999 | Tseng | A47C 4/46 297/27 |
| 6,843,527 | B2 * | 1/2005 | Nelson | A47C 4/40 297/18 |
| 7,147,277 | B1 * | 12/2006 | Miller | A47C 1/0265 297/19 |
| D986,974 | S * | 5/2023 | Chen | D21/326 |
| 2007/0145792 | A1 * | 6/2007 | Miller | A47C 7/008 297/184.1 |
| 2019/0290009 | A1 * | 9/2019 | Murphy | A47C 7/72 |
| 2020/0069059 | A1 * | 3/2020 | Ortiz | A47C 4/24 |
| 2021/0379498 | A1 * | 12/2021 | Sampaio | A47C 15/004 |
| 2022/0087435 | A1 * | 3/2022 | Smit | A47C 7/70 |

* cited by examiner

FOLDABLE CHAIR

CROSS REFERENCE

The present application claims foreign priority of Chinese Patent Application No. 202420054484.7, filed on Jan. 9, 2024, in the China National Intellectual Property Administration, the entire contents of which are hereby incorporated by reference in its entirety.

TECHNICAL FIELD

The present disclosure relates to the field of portable leisure goods, and especially relates to a foldable chair.

BACKGROUND

With the continuous improvement of people's material and cultural standards, there is an increasing number of devices and modes of entertainment and recreation available to people. Among them, racing games have a wider market, especially by the young people.

In order to improve the racing game experience, players are often equipped with game seats suitable for simulating the racing car environment. However, conventional racing game seats are large and heavy, which are not easy to use at home.

SUMMARY OF THE DISCLOSURE

Based on this, it is necessary to propose a foldable chair suitable for racing games that is easy to adjust and easy to store.

The present disclosure provides a foldable chair, including a first bracket and a second bracket that are hingedly fixed in an X-shape; wherein the foldable chair further includes an adjusting mechanism connecting an upper portion of the first bracket and a lower portion of the second bracket; the adjusting mechanism includes a fixing member and a movable member, the fixing member including a slide groove, and the movable member including a limit member movable within the slide groove; the slide groove has a serrated first inner side wall and a smooth second inner side wall, and the limit member is snapable to the first inner side wall.

In some embodiments, a lower end of the fixing member is fixed to the lower portion of the second bracket, an upper end of the movable member is fixed to the upper portion of the first bracket, and the limit member is disposed at a lower end of the movable member; in condition of the upper portion of the first bracket approaching the upper portion of the second bracket, the limit member is moved towards an upper end of the fixing member.

In some embodiments, a distance from the lower end of the fixing member to a hinge joint of the first bracket and the second bracket is greater than a distance from the upper end of the movable member to the hinge joint of the first bracket and the second bracket, and the first inner side wall is close to the hinge joint of the first bracket and the second bracket.

In some embodiments, the foldable chair further includes a third bracket rotatably fixed to a lower end of the first bracket.

In some embodiments, the foldable chair further includes a seat cover; wherein an end of the seat cover is sleeved on the upper portion of the first bracket, and another end of the seat cover is capable of being sleeved on an upper portion of the second bracket.

In some embodiments, the upper portion of the first bracket includes a first portion extending from the hinge joint and a second portion rotatably connected to an end of the first portion away from the hinge joint.

In some embodiments, the second portion is curved.

In some embodiments, the upper portion of the second bracket includes a third portion extending from the hinge joint and a fourth portion curved and extending from an end of the third portion away from the hinge joint.

The foldable chair provided by the present disclosure includes a first bracket and a second bracket that are hingedly fixed in an X-shape, and an adjusting mechanism connecting an upper portion of the first bracket and a lower portion of the second bracket. The adjusting mechanism includes a fixing member and a movable member, the fixing member including a slide groove, and the movable member including a limit member movable within the slide groove; the slide groove has a serrated first inner side wall and a smooth second inner side wall, and the limit member is snapable to the first inner side wall. By virtue of the adjusting mechanism, the foldable chair of the present disclosure may be easily folded or unfolded, and the degree of unfolding of the foldable chair may be adjusted by changing the position of the limit member snapped to the first inner side wall.

BRIEF DESCRIPTION OF THE DRAWINGS

In order to more clearly illustrate the technical solutions in the specific embodiments of the present disclosure or the related art, the following will briefly introduce the accompanying drawings that need to be used in the specific embodiments or related art. It is obvious that the attached drawings in the following description are some of the embodiments of the present disclosure. For those skilled in the art, other accompanying drawings may be obtained from these drawings without creative effort.

DETAILED DESCRIPTION

The following will be a clear and complete description of the technical solution of the present disclosure in conjunction with the accompanying drawings. Obviously, the described embodiments are part of the embodiments of the present disclosure, not all of them. Based on the embodiments in the present disclosure, all other embodiments obtained by those skilled in the art without making creative labor belong to the scope of the present disclosure.

In the description of the present disclosure, it should be noted that if terms "center", "upper", "lower", "left", "right", "vertical", "horizontal", "inside", "outside", etc. are used, the orientation or position relationship indicated therein is based on the orientation or position relationship shown in the accompanying drawings and is only for the purpose of facilitating and simplifying the description of the present disclosure, not to indicate or imply that the device or component referred to must have a specific orientation, be constructed and operated in a specific orientation, and therefore cannot be construed as a limitation of the present disclosure. In addition, the terms "first", "second", and "third" are used for descriptive purposes only, and are not to be construed as indicating or implying relative importance.

Figure 1:
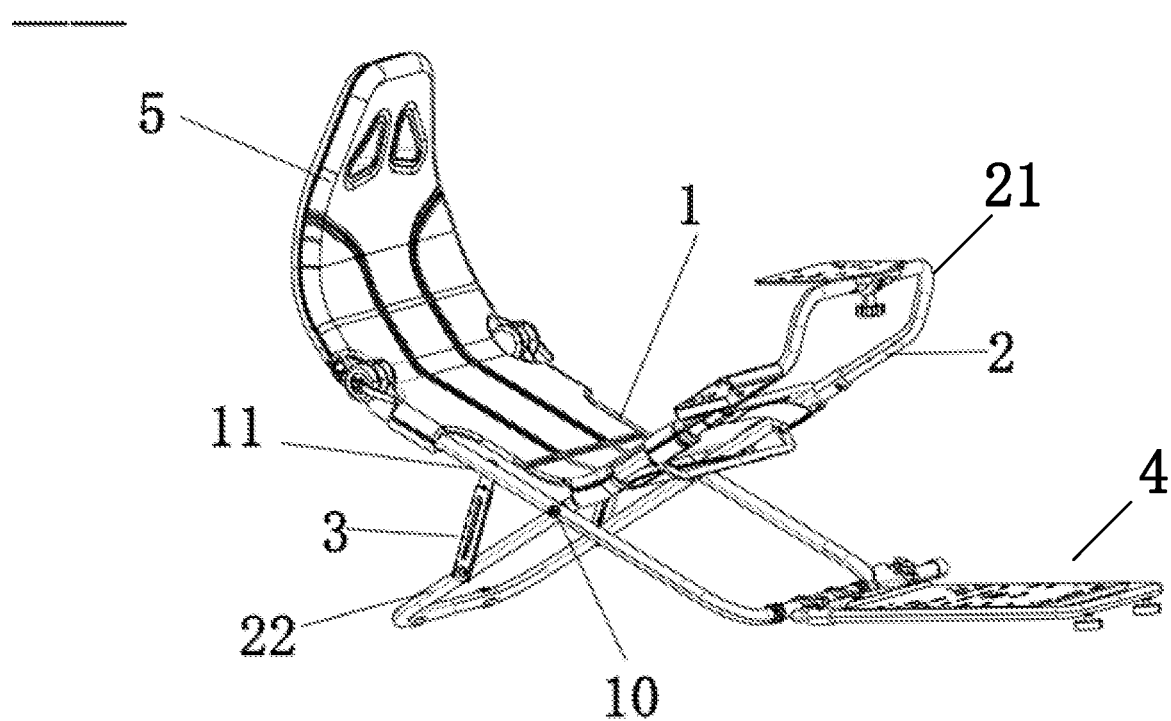
FIG. 1 is an assembled schematic view of a foldable chair in an unfolded state according to some embodiments of the present disclosure.
Figure 2:
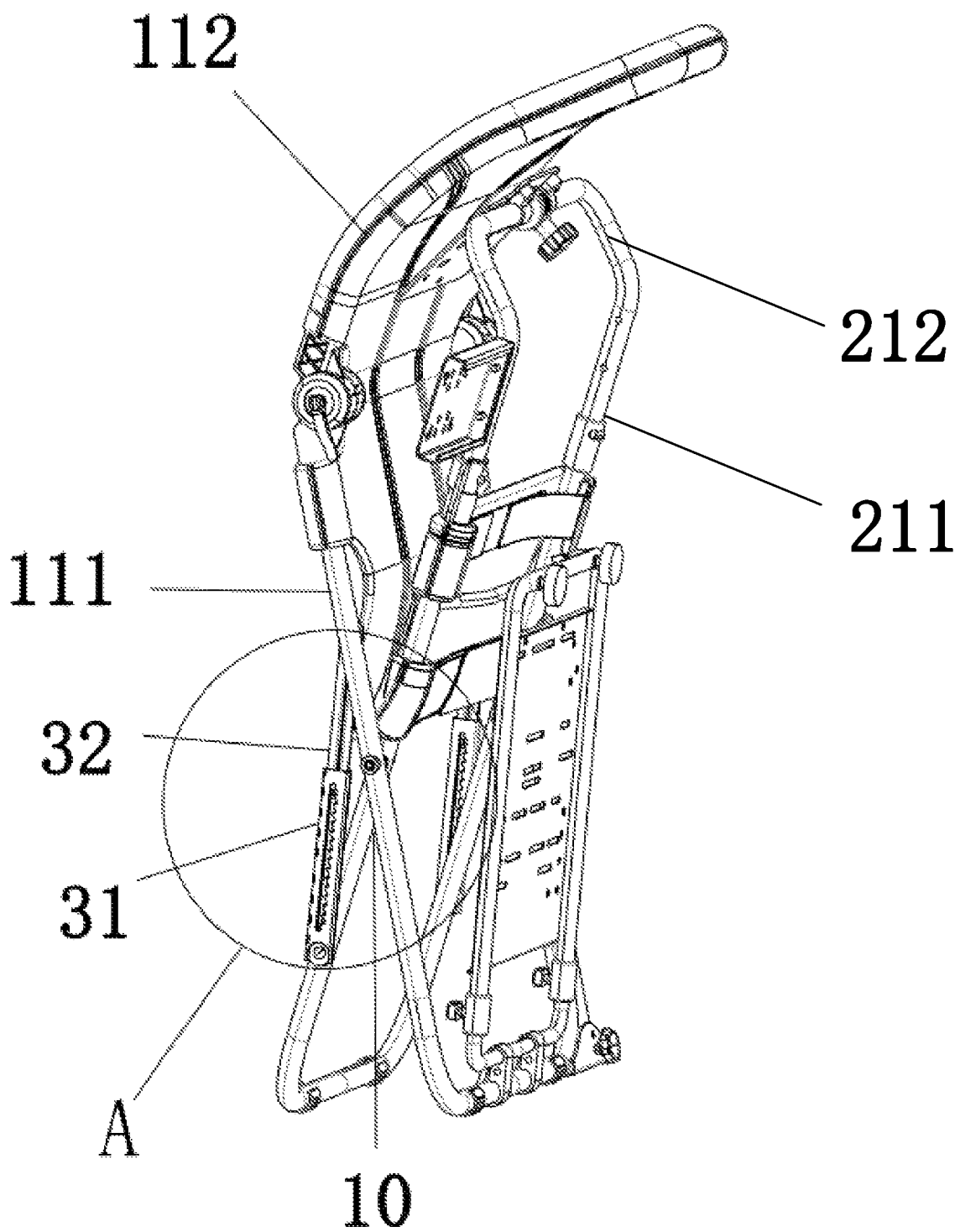
FIG. 2 is an assembled schematic view of a foldable chair in a folded state according to some embodiments of the present disclosure.
Figure 3:
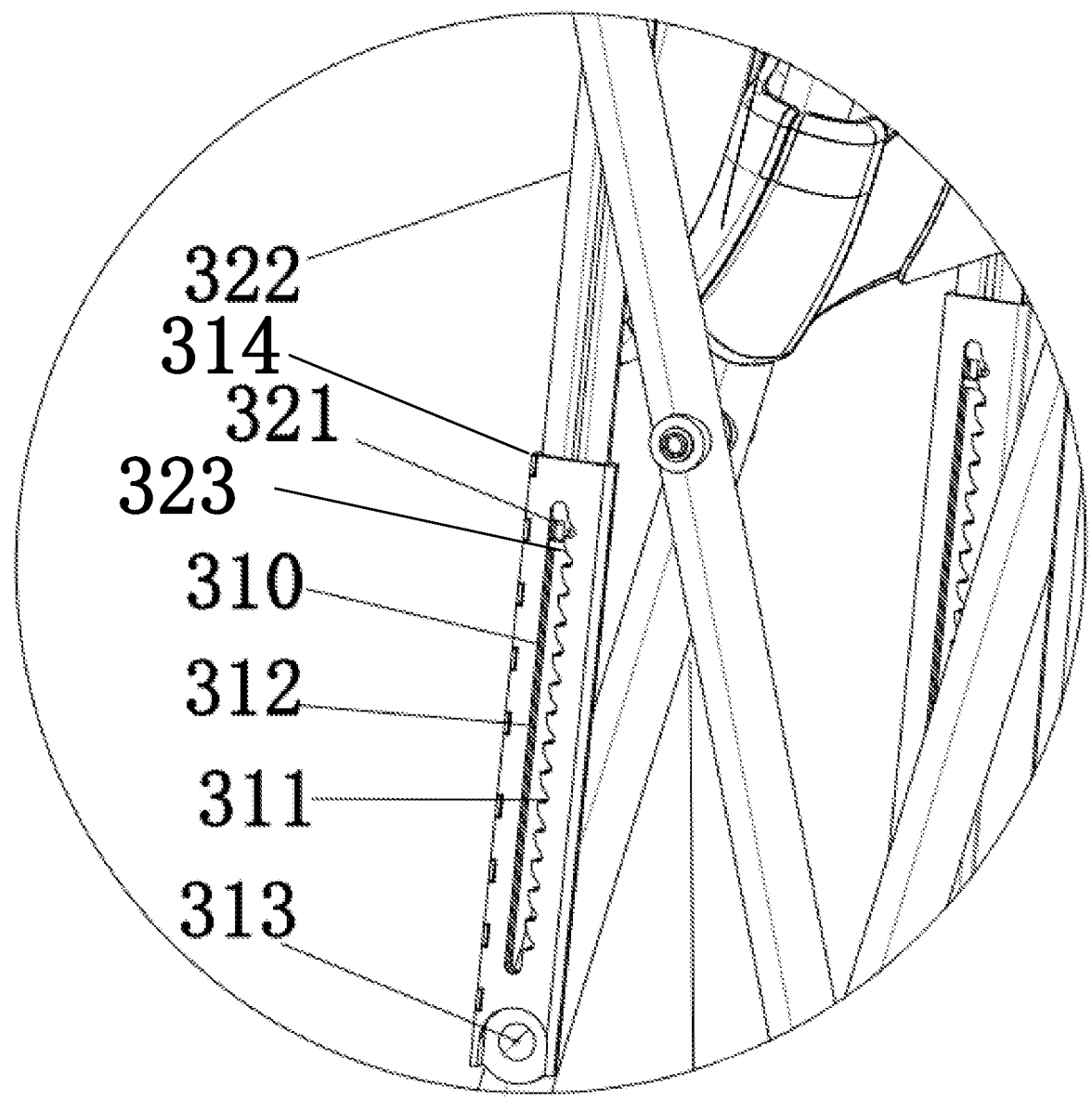
FIG. 3 is an enlarged view of area A in FIG. 2.

As shown in FIG. 1-FIG. 3, the present disclosure provides a foldable chair 100, including a first bracket 1 and a second bracket 2 that are hingedly fixed in an X-shape, and an adjusting mechanism 3 connecting an upper portion 11 of the first bracket 1 and a lower portion 22 of the second bracket 2. Specifically, the adjusting mechanism 3 includes a fixing member 31 and a movable member 32, the fixing member 31 including a slide groove 310, and the movable member 32 including a limit member 321 movable within the slide groove 310. The slide groove 310 has a serrated first inner side wall 311 and a smooth second inner side wall 312, and the limit member 321 is snapable to the first inner side wall 311.

In the embodiment, a lower end 313 of the fixing member 31 is fixed to the lower portion 22 of the second bracket 2, an upper end 322 of the movable member 32 is fixed to the upper portion 11 of the first bracket 1, and the limit member 321 is disposed at a lower end 323 of the movable member 32. When the upper portion 11 of the first bracket 1 is close to the upper portion 21 of the second bracket 2, the limit member 321 is moved towards an upper end 314 of the fixing member 31.

In some embodiments, a distance from the lower end 313 of the fixing member 31 to a hinge joint 10 of the first bracket 1 and the second bracket 2 is greater than a distance from the upper end 322 of the movable member 32 to the hinge joint 10 of the first bracket 1 and the second bracket 2, and the first inner side wall 311 is close to the hinge joint 10 of the first bracket 1 and the second bracket 2.

The foldable chair 100 further includes a third bracket 4 rotatably fixed to a lower end of the first bracket 1.

The foldable chair 100 further includes a seat cover 5, where an end of the seat cover 5 is sleeved on the upper portion 11 of the first bracket 1, and another end of the seat cover 5 is capable of being sleeved on an upper portion 21 of the second bracket 2.

The upper portion 11 of the first bracket 1 includes a first portion 111 extending from the hinge joint 10 and a second portion 112 rotatably connected to an end of the first portion 111 away from the hinge joint 10. In some embodiments, the second portion 112 is curved.

The upper portion 21 of the second bracket 2 includes a third portion 211 extending from the hinge joint 10 and a fourth portion 212 curved and extending from an end of the third portion 211 away from the hinge joint 10.

The foldable chair 100 provided by the present disclosure includes a first bracket 1 and a second bracket 2 that are hingedly fixed in an X-shape, and an adjusting mechanism 3 connecting an upper portion 11 of the first bracket 1 and a lower portion 22 of the second bracket 2. The adjusting mechanism 3 includes a fixing member 31 and a movable member 32, the fixing member 31 including a slide groove 310, and the movable member 32 including a limit member 321 movable within the slide groove 310; the slide groove 310 has a serrated first inner side wall 311 and a smooth second inner side wall 312, and the limit member 321 is snapable to the first inner side wall 311. By virtue of the adjusting mechanism 3, the foldable chair 100 of the present disclosure may be easily folded or unfolded, and the degree of unfolding of the foldable chair 100 may be adjusted by changing the position of the limit member 321 snapped to the first inner side wall 311.

The above embodiments are only intended to illustrate the technical solution of the present disclosure, not to limit the same; despite the detailed description of the present disclosure with reference to the preceding embodiments, those skilled in the art should understand that it is still possible to modify the technical solutions recorded in the preceding embodiments, or to replace some or all of them with equivalent technical features; and these modifications or replacements do not make the essence of the corresponding technical solutions out of the scope of the technical solutions of the embodiments of the present disclosure.

What is claimed is:

1. A foldable chair, comprising a first bracket and a second bracket that are hingedly fixed in an X-shape; wherein the foldable chair further comprises an adjusting mechanism connecting an upper portion of the first bracket and a lower portion of the second bracket; the adjusting mechanism comprises a fixing member and a movable member, the fixing member comprising a slide groove, and the movable member comprising a limit member movable within the slide groove; the slide groove has a serrated first inner side wall and a smooth second inner side wall, and the limit member is snapable to the first inner side wall.

2. The foldable chair according to claim 1, wherein a lower end of the fixing member is fixed to the lower portion of the second bracket, an upper end of the movable member is fixed to the upper portion of the first bracket, and the limit member is disposed at a lower end of the movable member; in condition of the upper portion of the first bracket approaching the upper portion of the second bracket, the limit member is moved towards an upper end of the fixing member.

3. The foldable chair according to claim 2, wherein a distance from the lower end of the fixing member to a hinge joint of the first bracket and the second bracket is greater than a distance from the upper end of the movable member to the hinge joint of the first bracket and the second bracket, and the first inner side wall is close to the hinge joint of the first bracket and the second bracket.

4. The foldable chair according to claim 1, further comprising a third bracket rotatably fixed to a lower end of the first bracket.

5. The foldable chair according to claim 1, further comprising a seat cover; wherein an end of the seat cover is sleeved on the upper portion of the first bracket, and another end of the seat cover is capable of being sleeved on an upper portion of the second bracket.

6. The foldable chair according to claim 1, wherein the upper portion of the first bracket comprises a first portion extending from a hinge joint of the first bracket and the second bracket and a second portion rotatably connected to an end of the first portion away from the hinge joint.

7. The foldable chair according to claim 6, wherein the second portion is curved.

8. The foldable chair according to claim 1, wherein the upper portion of the second bracket comprises a third portion extending from a hinge joint of the first bracket and the second bracket and a fourth portion curved and extending from an end of the third portion away from the hinge joint.

\* \* \* \* \*